Patented Dec. 1, 1925.                                    1,563,587

UNITED STATES PATENT OFFICE.

MURRAY RANEY, OF CHATTANOOGA, TENNESSEE.

METHOD OF PREPARING CATALYTIC MATERIAL.

No Drawing.        Application filed September 20, 1924. Serial No. 738,952.

*To all whom it may concern:*

Be it known that I, MURRAY RANEY, a citizen of the United States, and resident of Chattanooga, in the county of Hamilton and State of Tennessee, have invented certain new and useful Improvements in Methods of Preparing Catalytic Material, of which the following is a specification.

My present invention relates to the preparation of catalytic material for commercial purposes, such as may be used in the hydrogenation of animal, vegetable and fish oils, waxes, fats, hydrocarbon oils, and the like.

The principal object of the invention relates to a novel method of preparing a catalytic material which will be useful in the arts as above mentioned.

Still another object of the invention is the preparation of finely divided catalytic nickel by a method which will insure the maximum catalytic properties being made effective, and in a very pure state.

To this end my invention contemplates the fusing together of metallic nickel and metallic silicon in proper proportions, pulverizing the mass, and then dissolving the silicon by means of a proper solvent, or otherwise separating the nickel and the silicon whereby the nickel remains in a finely divided state and its catalytic properties are intensified and made available for various uses.

In carrying out the invention I have found it very satisfactory to melt together pure nickel which will run in analysis approximately .05 of 1 percent iron, .05 of 1 percent carbon, and .02 of 1 percent silicon as impurities. With this fused material I alloy metallic silicon running about 97 to 98 percent silicon and one percent iron, in the preferred proportion of 40% silicon and 60% nickel, to 50% silicon and 50% nickel. The two elements may be fused separately and then poured together, or fused in the same melt, as may be desirable. I find a convenient way of mixing the two is to place the two metals in the desired proportions in a covered graphite crucible, and heat to the melting point in a coke or oil fire. The melting, however, may be done by any convenient method, care being taken, however, not to contaminate the alloy with impurities from the fire. If the elements are melted separately and then poured together, considerable caution should be exercised, as they unite with a generation of a large amount of heat.

I have found that the proportions may be varied from 20% silicon and 80% nickel, to 90% silicon and 10% nickel.

After the nickel silicon alloy is prepared and cooled, it is pulverized in a suitable mill or grinder, and then treated with sodium hydroxide, which attacks and dissolves the silicon. During the treatment hydrogen gas suitable for hydrogenating purposes is generated, and the finely divided nickel remains as such in the solution. After being washed free from sodium silicate, this finely divided nickel will be found to be catalytic and ready to be used without further treatment.

The proportion and strength of the caustic soda may vary with circumstances. For instance, the nickel silicon alloy may be treated with 76% solid caustic soda in the proportion as required by the following equation:

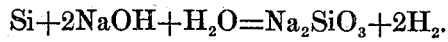

$$Si+2NaOH+H_2O=Na_2SiO_3+2H_2.$$

This treatment is preferably carried out in a closed vessel with agitation so that the hydrogen which is liberated may be condensed into a gas holder and used for any purpose desired. Where it is not desired to save the hydrogen, the treatment may be carried on in an open vessel. After the generation of gas has ceased, the contents of the tank are allowed to settle and the sodium silicate decanted. The contents of the tank are then washed with water to remove any excess caustic or silicate of soda before using the finely divided nickel as a catalyzer.

Obviously any other solvent may be used which would attack the silicon and not the nickel.

The alloy produced by this process before caustic soda treatment, is not magnetic, is easily pulverized, neither malleable, ductile nor tough, but friable. Obviously various uses may be found for an alloy having such properties other than that above mentioned, and I therefore, do not wish to be limited thereto.

I have found that owing to cheapness, a ferro-silicon alloy containing from 90 to 95% silicon, may be used, although the pure silicon above referred to is preferable.

Having thus described my invention, what I claim is:—

1. The process of preparing a catalyzer which includes the step of alloying the same with non-catalytic material and dissolving the non-catalytic material from the resultant alloy, whereby the catalytic material remains in finely divided condition.

2. The process of preparing a catalytic material which includes the step of alloying nickel with a non-catalytic material and dissolving the non-catalytic material from the resultant alloy, whereby finely divided catalytic nickel remains, and separating said nickel from said solution.

3. A process of preparing catalytic nickel which includes the step of alloying nickel and silicon, pulverizing the resultant alloy and dissolving the silicon therefrom with caustic soda, and separating the remaining nickel from the solution.

4. A method of preparing catalytic nickel which includes the step of alloying nickel with a non-catalytic material in the proportion of from 50% to 60% nickel, pulverizing the resultant alloy, dissolving the non-catalytic material therefrom, and removing the resultant finely divided catalytic nickel from the solution.

5. A method of preparing catalytic nickel which includes the step of alloying 50% nickel with 50% silicon, pulverizing the resultant alloy, treating the same with caustic soda until the silicon has been converted into sodium silicate, and removing the finely divided catalytic material from the solution.

In testimony whereof, I affix my signature.

MURRAY RANEY.